(12) United States Patent
Shakib et al.

(10) Patent No.: US 7,487,144 B2
(45) Date of Patent: Feb. 3, 2009

(54) INLINE SEARCH RESULTS FROM USER-CREATED SEARCH VERTICALS

(75) Inventors: Darren A. Shakib, North Bend, WA (US); Ramez Naam, Seattle, WA (US); Gary William Flake, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 196 days.

(21) Appl. No.: 11/420,108

(22) Filed: May 24, 2006

(65) Prior Publication Data

US 2007/0276803 A1 Nov. 29, 2007

(51) Int. Cl.
*G06F 7/00* (2006.01)
(52) U.S. Cl. ............ 707/3; 707/7; 707/5; 707/10
(58) Field of Classification Search ............ 707/3, 707/6, 7
See application file for complete search history.

(56) References Cited

U.S. PATENT DOCUMENTS

| | | | |
|---|---|---|---|
| 6,041,326 A | | 3/2000 | Amro |
| 6,169,986 B1* | | 1/2001 | Bowman et al. ........ 707/5 |
| 6,631,372 B1* | | 10/2003 | Graham .................. 707/5 |
| 6,873,990 B2 | | 3/2005 | Oblinger |
| 2003/0182254 A1* | | 9/2003 | Plastina et al. .......... 707/1 |
| 2004/0010489 A1 | | 1/2004 | Rio |
| 2004/0215608 A1 | | 10/2004 | Gourlay |
| 2005/0080786 A1 | | 4/2005 | Fish |
| 2005/0160083 A1* | | 7/2005 | Robinson ................ 707/3 |
| 2005/0234883 A1 | | 10/2005 | Szeto |
| 2006/0004725 A1 | | 1/2006 | Abraido-Fandion |
| 2006/0242013 A1* | | 10/2006 | Agarwal et al. ......... 705/14 |
| 2006/0248078 A1* | | 11/2006 | Gross et al. ............. 707/5 |
| 2007/0244862 A1* | | 10/2007 | Adams et al. ........... 707/3 |

FOREIGN PATENT DOCUMENTS

WO WO 2005/024661 A2 3/2005

OTHER PUBLICATIONS

Jun Lai and Ben Soh, "Personalized Web Search Results with Profile Comparison," Proceedings of the Third International Conference on Information Technology and Applications, 2005, IEEE Computer Society, VIC, Australia.
Stephan Chalup, Frederick Maire, "A Study on Hill Climbing Algorithms For Neural Network Training," 1999, IEEE.

* cited by examiner

*Primary Examiner*—Apu M Mofiz
*Assistant Examiner*—Thu Nga Nguyen
(74) *Attorney, Agent, or Firm*—Shook, Hardy & Bacon L.L.P.

(57) ABSTRACT

A method and system is provided for automatically presenting search results from user-created search verticals or search macros in response to general web-search queries. A general web-search query is received and a set of user-created search verticals is initially identified using keywords contained in the query. A subset of target user-created search verticals is identified using factors such as whether the user has installed a tab for a particular vertical in a customized user interface, whether the search query has been used in a particular search vertical with a high frequency, and an overall or query-specific customer satisfaction rating for a particular search vertical. The search results can be presented as inline answers or inline suggestions on a common display with general search results obtained for the general search query.

12 Claims, 5 Drawing Sheets

INLINE SEARCH RESULTS FROM USER-CREATED SEARCH VERTICALS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

Search engines are becoming an increasingly important way of traversing the vast quantity of information, such as web sites and documents, available on the internet today. Conventional search engine technologies, such as those offered by MSN, Google, and Yahoo, are often used to perform general, "horizontal" web-searches of the broad web. More recently, in response to users' desire to perform tailored searches and receive more precise results, search engines have begun offering the option of performing "vertical" web-searches over defined portions of the web. For example, users can choose to search a "shopping" vertical to locate items being sold on the web. Users may choose to search the web for only news-related items by using a "news" search vertical. And, users may wish to only search for images relevant to a search query by using an "images" search vertical. These search verticals allow users to specify a particular type of search rather than simply entering a general web-search query into a general horizontal search engine.

Today, users wishing to perform vertical searches must use a limited number of pre-defined search verticals currently available on the web. The limited number of search verticals currently available may not allow a user to perform a particular type of tailored search over a desired portion of the web. For example, a user wishing to only search scholarly health articles on the web may not have access to a search vertical designed to perform such searches. Users may choose to design their own search verticals or use search verticals that have been authored by others. Such search verticals would provide an invaluable resource to horizontal search engines designed to search the broad web if these search engines could access these verticals to enhance general web-search queries.

Users may not be aware of particular user-created search verticals that could potentially provide precise search results to a general search query. For example, a user searching for recipes may not know to search a user-created recipe vertical and may simply enter the query into a general search engine. If a general search engine had the ability to access these user-created search verticals, the accuracy and precision of general web-search queries could be greatly enhanced. In addition, if these user-created search verticals could be improved by rewarding search vertical authors whose verticals are widely used, the quality of general web-search results could also be greatly enhanced. A way is needed to improve general web-searches by taking advantage of user-created search verticals and by rewarding search vertical authors who create high-quality search verticals.

BRIEF SUMMARY

In an embodiment, a method for returning vertical search results from user-created search verticals in response to general web-search queries is provided. When a user enters a query into a general web-search utility, user-created search verticals from which potential results could be provided are identified based on the query. The verticals are evaluated to determine whether or not to return results from one or more of the search verticals. If any of the verticals have been previously installed by the user into a customized user interface, then results may be returned from these verticals. If the particular query has been used frequently with a particular search vertical that has a high customer satisfaction rating, then results may be returned from the vertical. In an embodiment, when results are returned from a search vertical, either as inline answers or as inline suggestions, the search vertical's author is compensated by receiving a share of the revenue generated from the search.

In another embodiment, a method for automatically presenting inline answers or suggestions from user-created search verticals in response to general web-search queries is provided. After a general search query is received, the user-created search verticals that a user has installed into his or her customized search interface are accessed. If any of the user's installed verticals support inline answers or suggestions relevant to the general query, then answers or suggestions are presented with general search results on a common display.

In another embodiment, a system for presenting search answers or suggestions from user-created search verticals is provided. The system includes a data store, a search-engine component, a vertical determiner, and an interface component. The data store contains stored web content, stored user-created search verticals, and stored revenue-sharing elements. The search-engine component obtains general web-search results from the data store and search vertical results from the user-created search verticals. The vertical determiner determines which user-created verticals to obtain search results from and whether to display those results as answers or suggestions. The interface component receives general web-search queries and presents inline answers and suggestions on a common display with general search results.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE SEVERAL VIEWS OF THE DRAWINGS

Embodiments of the present invention are described in detail below with reference to the attached drawing figures, which are incorporated by reference herein and wherein.

DETAILED DESCRIPTION

The subject matter of the present invention is described with specificity to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the term "step" may be used herein to connote different elements of methods employed, the term should not be interpreted as implying any particular order among or between various steps herein disclosed unless and except when the order of individual steps is explicitly described. Further, the present invention is described in detail below with reference to the attached drawing figures, which are incorporated in their entirety by reference herein.

Embodiments of the present invention provide methods for presenting inline search results from user-created search verticals in response to general web-search queries. An exemplary operating environment for embodiments of the present invention is described below, though many other suitable operating environments can be used.

Figure 1:
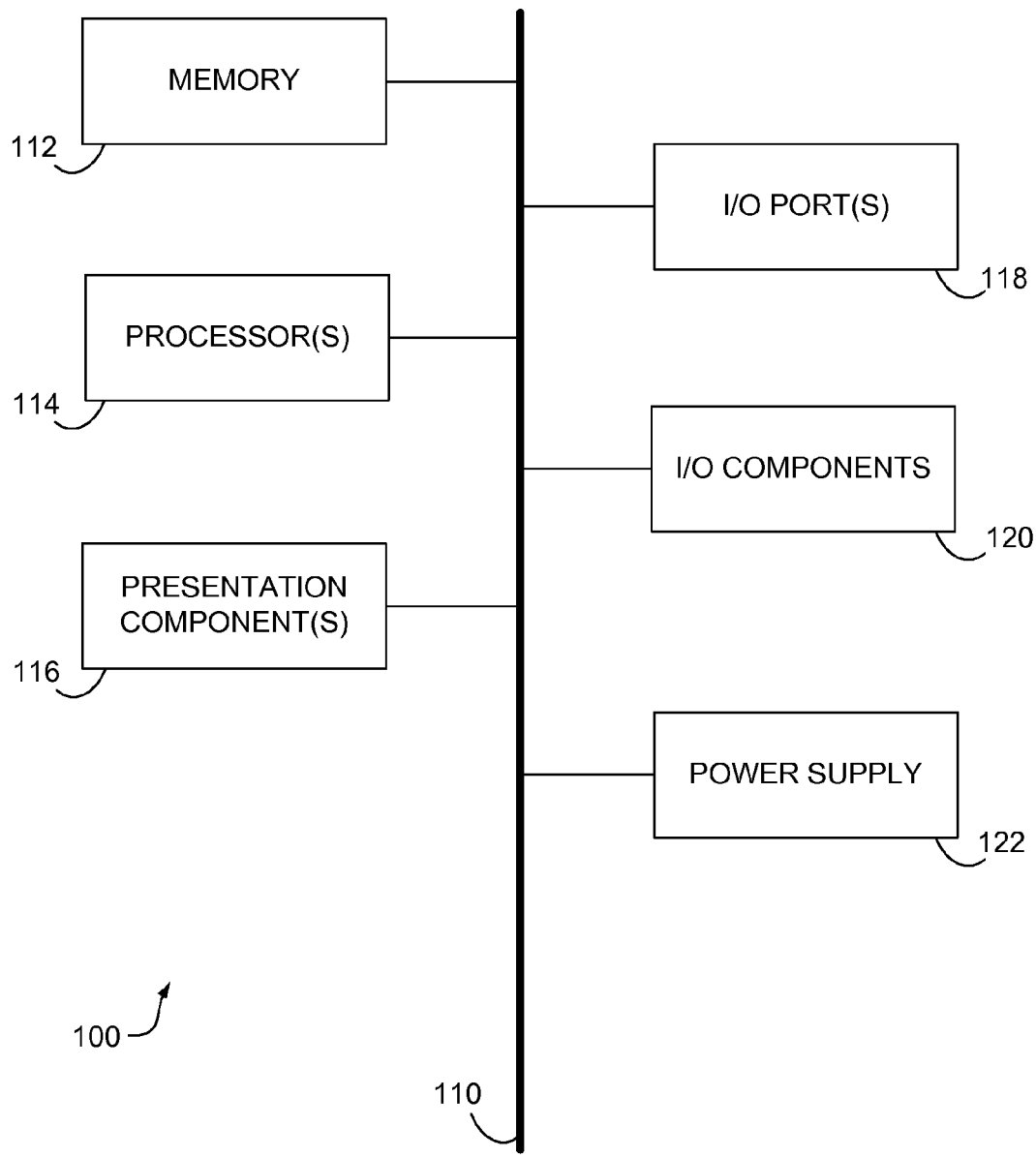
FIG. 1 is a block diagram of an exemplary operating environment.

Referring initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing-environment 100 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 1, computing device 100 includes a bus 110 that directly or indirectly couples the following elements: memory 112, one or more processors 114, one or more presentation components 116, input/output ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be gray and fuzzy. For example, one may consider a presentation component such as a display device to be an I/O component. Also, processors have memory. It should be noted that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

Computing device 100 typically includes a variety of computer-readable media. By way of example, and not limitation, computer-readable media may comprise Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices, carrier wave or any other medium that can be used to encode desired information and be accessed by computing device 100.

Memory 112 includes computer-storage media in the form of volatile and/or nonvolatile memory. The memory may be removable, nonremovable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc.

I/O ports 118 allow computing device 100 to be logically coupled to other devices including I/O components 120, some of which may be built in. Illustrative components include a microphone, joystick, game pad, satellite dish, scanner, printer, wireless device, etc.

As previously mentioned, embodiments of the present invention relate to methods for presenting inline search results from user-created search verticals in response to general web-search queries.

Figure 2:
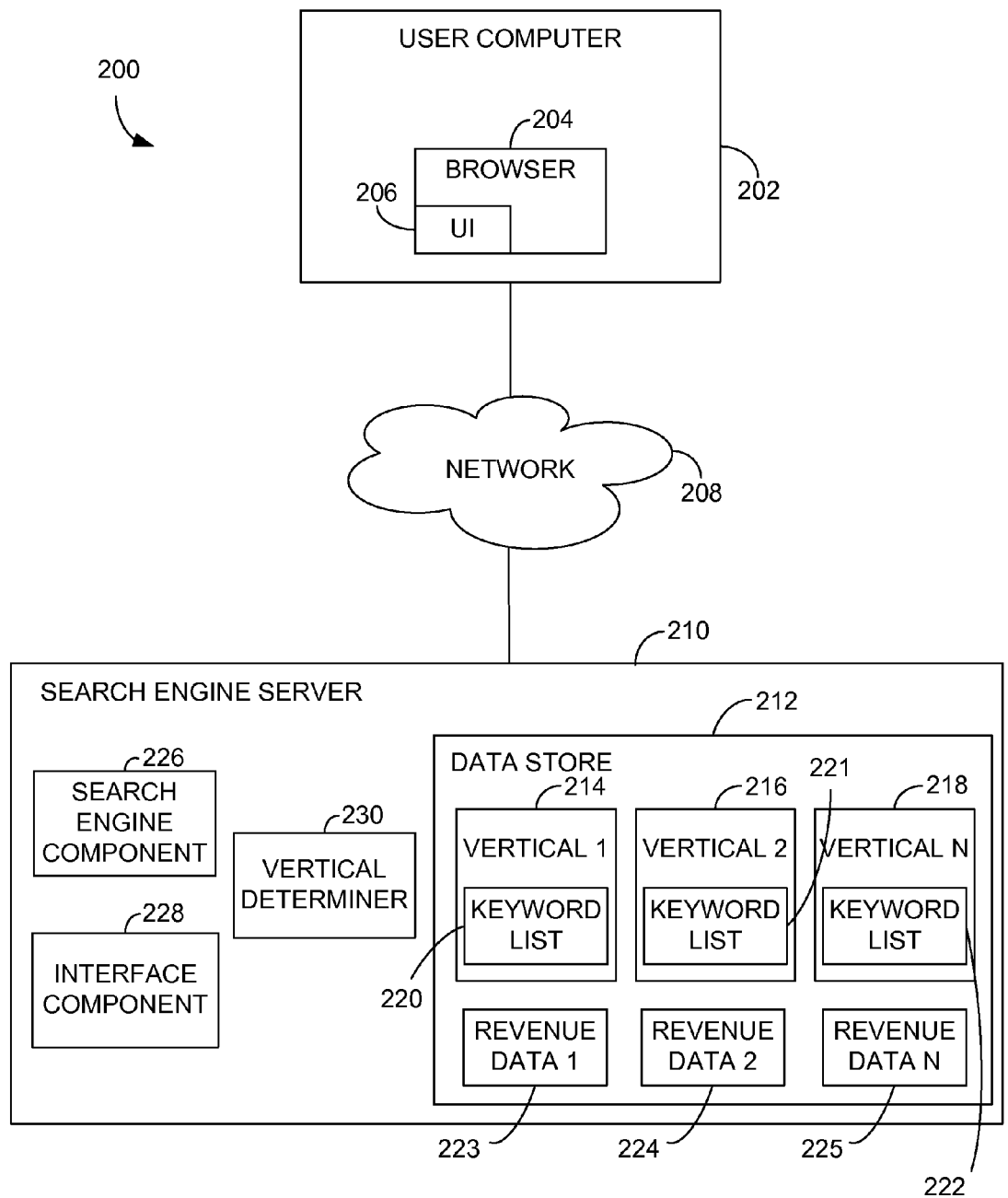
FIG. 2 is a diagram of an exemplary system in accordance with embodiments of the present invention.

FIG. 2 provides an exemplary system 200 for providing inline search results from user-created search verticals in response to general web-search queries. The system 200 includes a user computer 202, such as the computing device 100 described above. The user computer 202 has a browser 204 accessible via a user interface (UI) 206. The user computer 202 is coupled via a network 208 to a search engine server 210. The search engine server 210 includes a data store 212, a search engine component 226, an interface component 228, and a vertical determiner 230.

The data store 212 can store any type of information. This information may include web content, web-search results, images, news, facts, and other types of information commonly found on the web, for example. The data store 212 may also include advertising content. Although data store 212 is depicted as a single data store in FIG. 2, in reality, data store 212 can be any number of separate data stores in communication with each other. And, these data stores need not be located on the same server. In addition, data store 212 can be in communication with other data stores located on other servers.

The data store 212 also includes user-created search verticals 214, 216, and 218. User-created search vertical "N" designates that any number of user-created search verticals may be stored in data store 212. The user-created search verticals can be any type of instructions that can be used by the search engine component 226 to traverse the data store 212 to obtain tailored search results in response to a web-search query. User-created search verticals can be customized sets of search engine rules, such as search macros or other user-defined sets of search operators built using a query language, for example. A user may create his or her own search vertical or use search verticals developed by other users. A template approach may be provided for search vertical creation in which search vertical features (e.g., search operators and user interface operators) are modularized to allow users to define those features. In operation, a search vertical can modify various rules of a pre-defined search engine in accordance with the user-defined set of search operators. Search verticals differ from conventional vertical search engines in that they are user-created rather than pre-defined by a search engine provider. When the term "user" is used herein, such as in "user-created" or "user-defined", the term is used to refer to search-engine consumers (including individuals such as laypersons and so-called "uber-users") so as to differentiate them from search-engine providers (the software professionals and groups who design and build search engines from bottom-up). That is, a "user" is one who navigates to a website, search page, or other query-input location and can create his or her own customized search vertical or use a customized search vertical created by another user.

In an embodiment, the user-created search verticals 214, 216, and 218 include programmed keyword lists 220, 221, and 222, respectively. These keyword lists are glossaries of keywords associated with the particular search vertical. The vertical determiner 230 can determine whether to considering using a particular user-created search vertical by determining whether a search query contains keywords similar to those contained in the search vertical's keyword list. In addition, the user-created search verticals use their respective keyword lists to obtain and store vertical search results for queries entered into the user-created search vertical. For example, a "weightlifting" user-created search vertical might include keywords such as weightlifting, weight training, strength training, fitness, bench press, incline press, barbell, dumbbell, and other weightlifting-related terms. If a user inputs a general web-search query of "bench press techniques," then the vertical determiner 230 can determine that vertical search results should be returned from the "weightlifting" user-created search vertical because the query contains similar keywords to those contained in the vertical's keyword list.

Vertical-defined keywords are optional and could be calculated in an automated fashion by monitoring usage. User-created search verticals need not be based on programmed keyword lists and can be generated based on algorithms for filtering and ranking a common set of search results differently than how a conventional pre-defined search engine or another search vertical would filter and rank the set of results. For example, a user-created search vertical can be designed to obtain general search results using a conventional search engine and then filter the results based on websites (e.g., URL) or words. In addition, vertical-defined keywords can be calculated in an automated fashion by monitoring usage of the vertical.

The data store 212 also includes revenue-sharing data elements 223, 224, and 225 corresponding to each of the user-created search verticals 214, 216, and 218, respectively. The revenue-sharing data elements store information relating to compensation of the search vertical authors of each of the respective user-created search verticals. The revenue-sharing data elements can be based on raw usage, such as by compensating the author based on the number of queries for which results are pulled from the vertical (or based on user selections of search results displayed from the vertical), or by sharing a portion of advertising revenue earned from searches performed in the author's search vertical. Compensating for raw usage encourages development of both commercial and non-commercial search verticals, while advertising-based compensation rewards those verticals that generate the most revenue.

Search vertical usage can be tracked, such as for revenue sharing purposes, by augmenting the URL returned with the search results. When the user selects the augmented URL, then the request is returned to the search engine server 210, and the user is redirected to the target search results.

The search engine server 210 also includes a vertical determiner 230. The vertical determiner 230 can determine whether to obtain vertical search results such as answers or suggestions from the stored user-created search verticals in response to general web-search queries received by the interface component 228. The vertical determiner 230 contains code for determining whether a general web-search query should be performed using one or more of the stored user-created search verticals. The vertical determiner 230 can make this determination using a number of factors. These factors can include whether or not the user has installed a tab corresponding to the user-created search vertical into a customized user interface, whether the query contains keywords similar to those contained in a keyword list for the vertical, a query-frequency threshold for the vertical, and a customer satisfaction threshold for the vertical, for example.

The query-frequency threshold can be a minimum number of times that the particular search query has been performed in the user-created search vertical in the past. For example, if the query "bench press techniques" has been input into the "weightlifting" search vertical 1,000 times per day and a threshold of 500 times per day has been set, then the vertical determiner 230 will determine that vertical search results should be obtained from the weightlifting search vertical. The vertical determiner 230 is also operative to determine whether a particular user-created search vertical satisfies a customer satisfaction threshold. This customer satisfaction threshold can be based on a query-specific customer satisfaction or on an overall customer satisfaction for the search vertical. Methods of measuring customer satisfaction for particular searches are known in the art. For example, if the general search query "bench press techniques" has a 50% click-through rate for results returned from the "weightlifting" user-created search vertical and a threshold of 40% has been set, then the vertical determiner will determine that vertical search results should be returned from the weightlifting search vertical.

In addition, the vertical determiner 230 can determine whether vertical search results obtained from a user-created search vertical for a general web-search query will be displayed as answers or as suggestions to the user. Inline search answers are brief listings of vertical search results that are typically displayed immediately above general search results in the search results user interface. Inline suggestions suggest that the user allow the search engine to perform the general query in particular user-created search verticals. The vertical determiner 230 can use a confidence threshold to determine whether to display vertical search results as answers or suggestions. If the confidence threshold is met, then the vertical results are displayed as answers. The confidence threshold can be based on factors such as installation status (whether the user has installed a tab corresponding to the search vertical in a customized user interface), query-frequency, and customer satisfaction. For example, a "bench press techniques" general query may satisfy a confidence threshold with the "weightlifting" vertical, resulting in inline answers being displayed from the "weightlifting" vertical. But, the vertical determiner 230 may determine that a confidence threshold is not satisfied for a "fitness" vertical, and instruct the interface component 228 to present a suggestion to the user suggesting that the "bench press techniques" query be performed in the "fitness" vertical.

The interface component 228 can be configured to receive any number of user inputs, including web-search queries. The search queries may be entered as text, and the interface component may provide user-selectable options related to the desired content. That is, the interface component may provide a user interface with or without tabs corresponding to search verticals. The interface component 228 may display server-provided search verticals such as news and shopping verticals, as well as user-created search verticals such as "weightlifting" and "knitting." As various search queries are entered, the interface component 228 can communicate these inputs to the search engine component 226 and vertical determiner 230.

The search engine component 226 is operative to traverse the data store 212 to obtain search results in response to search queries. As discussed above, any number of data stores can be accessed and traversed by the search engine component 226, such as by communication via network 208. The search engine component 226 is capable of determining which search results are most relevant to particular search queries. Those skilled in the art will recognize that various search utilities exist in the art and that any of these known search techniques may be used. For example, the search engine component 226 may use search terms or keywords contained in the search query to identify matching or similar terms contained in potential search results stored in data store 212. And, as potential results are considered, the search engine component 226 may use a relevancy-ranking heuristic to determine which potential results should be selected. Again, such search techniques and relevancy-ranking heuristics are well known in the art, and the present invention is not limited to any particular search algorithm. The search engine component 226 is operative to perform web searches in user-created search verticals stored in data store 212, such as user-created search verticals 214, 216, and 218. Vertical determiner 230 and search engine component 226 are logically coupled such that the vertical determiner 230 can notify search engine component 226 whether to obtain results from a particular user-created search vertical.

Figure 3:
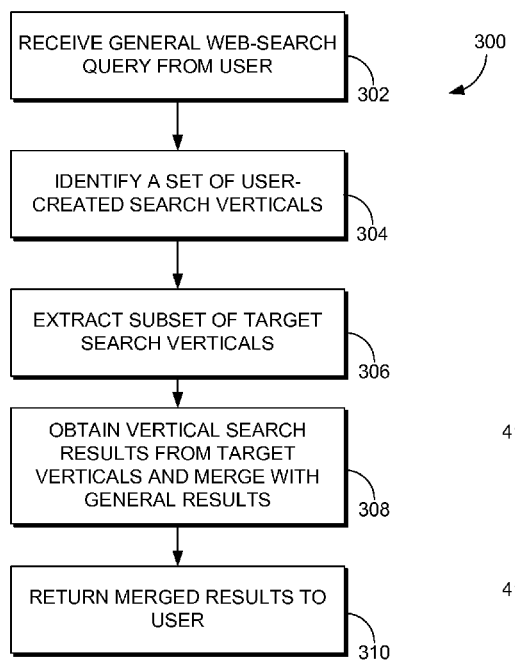
FIG. 3 is a flow diagram illustrating a method for presenting inline search results from user-created search verticals in response to general web-search queries, according to embodiments of the present invention.

FIG. 3 provides an exemplary method 300 for returning vertical search results from user-created search verticals in response to a general web-search query. At a step 302, a general web-search query is received from a user. A general web-search query is one that is entered into a general search engine rather than directly into a search vertical. In other words, a general web-search query is a core web-search query rather than a tailored search query performed exclusively within a search vertical. At a step 304, a set of user-created search verticals is identified based on keywords used in the general web-search query. This can be done by accessing programmed keyword lists stored for respective user-created search verticals on a search engine server. For example, if a general query of "sweater knitting techniques" is entered into a general web-search utility, a set of user-created search verticals is identified using one or more of the terms contained in the query. In this example, the identified set of user-created search verticals might include verticals corresponding to knitting, sewing, sweaters, fashion design, clothes-making, knitting resources, etc.

Not all of these user-created search verticals may provide accurate or reliable results to the general query. So, at a step 306, a subset of one or more target user-created search verticals is identified from the set of user-created search verticals based on a set of criteria. The set of criteria used to prune the list of user-created search verticals can include whether the user has installed a tab corresponding to a particular search vertical into a customized user interface (i.e., an installation status), a query-frequency for a particular vertical, an overall customer satisfaction rating for a particular vertical, or a query-specific customer satisfaction rating for a particular vertical. For example, if a user has installed a tab on a customized search user interface for a "knitting" search vertical, then the "knitting" search vertical is identified as a target user-created search vertical provided that it was initially identified based on associated keywords. Even if the user had not installed a tab for the "knitting" vertical, this vertical may still be identified as a target vertical if one or more terms from the query "sweater knitting techniques" appear with a sufficiently high frequency within the vertical so as to satisfy a query-frequency threshold. The set of user-created search verticals may be further pruned using a customer satisfaction rating, which can be a query-specific rating or an overall rating for each of the verticals.

At a step 308, vertical search results are obtained from the identified subset of target user-created search verticals and merged with general search results obtained for the general query. General search results include any type of search results returned by conventional search engine algorithms without the aid of search verticals. At a step 310, the merged results are returned to the user. The results can be displayed on a user interface, such as the exemplary user interface described below with reference to FIG. 6. The vertical search results can be displayed as inline answers or inline suggestions on a common display with the general search results. In addition, inline answers can be displayed exclusively without any general search results if the vertical determiner 230 determines that the answers satisfy a sufficiently high confidence threshold.

Figure 4:
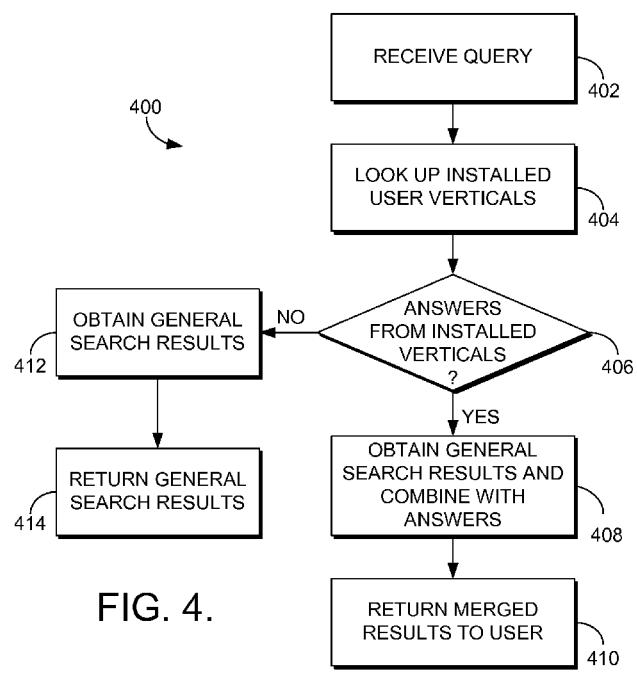
FIG. 4 is a flow diagram illustrating a method for presenting inline search results from user-created search verticals that a user has installed into a customized user interface, according to embodiments of the present invention.

FIG. 4 provides an exemplary method 400 for automatically presenting inline answers or suggestions from user-created search verticals in response to a general web-search query. At a step 402, a general query is received. At a step 404, user-created search verticals that have been installed by the user in a customized user interface are accessed. For example, the user may have installed user interface tabs corresponding to user-created search verticals for "recipes," "knitting," "weightlifting," and "history books," corresponding to the user's interests and subjects frequently searched by the user. At a step 406, the method 400 determines whether answers relevant to the query are available from an installed user-created search vertical. This can be done using programmed keyword lists stored for each user-created search vertical. If at a step 406 it is determined that answers are available from an installed user-created search vertical, then at a step 408, general search results relevant to the query are obtained and combined with answers obtained from the installed vertical. At a step 410, the answers from the installed user-created search vertical and the general web-search results are returned to the user by presenting them on a common display. If at step 406 it is determined that answers are not available from an installed user-created search vertical, then, at a step 412, general search results are obtained for the query. At a step 414, the general search results are returned to the user. For example, if a user enters a general search query for "snowshoes," and the keywords from this query do not match or are not similar to any of the keywords stored in the programmed keyword lists of the user-created search verticals that the user has installed, then no answers are obtained from the installed search verticals and a general web search is performed. But, in other embodiments, non-installed user-created search verticals can be used to obtain answers.

In addition, a search vertical author may designate in a definition of a user-created search vertical the set of criteria for determining whether inline answers or suggestions should be obtained and presented for general search queries. For example, a particular user-created search vertical may be more likely than another user-created search vertical to present answers in response to a general search query.

Figure 5:
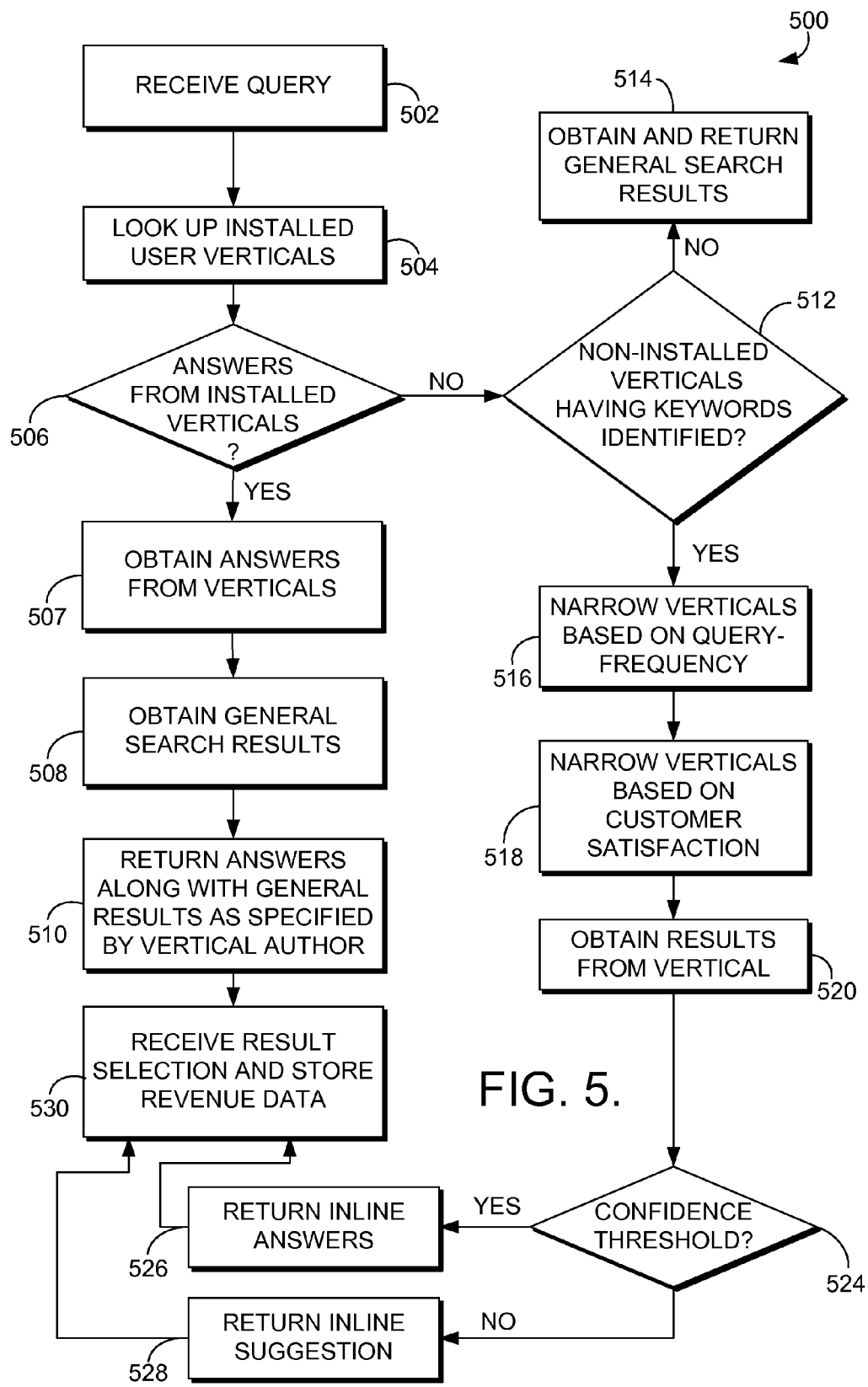
FIG. 5 is a flow diagram illustrating a method for determining whether to present inline search results from user-created search verticals in response to a general web-search query, according to embodiments of the present invention.

FIG. 5 provides an exemplary method 500 for automatically presenting search results from installed and non-installed user-created search verticals in response to general web-search queries. At a step 502, a general search query is received from a user. As described above, a general search query is one that is entered into a core web-search function as opposed to a query that is entered directly into a specific search vertical. At a step 504, a list of installed user-created search verticals is accessed for the user. The list of installed verticals can be stored remotely on a server or it can be stored locally on the user's computer. The installed verticals may have been installed in any way. For example, a user who creates his or her own user-created search vertical can have that vertical automatically installed unless they designate to un-install it. A user can select to install various user-created search verticals from a list of those verticals created by other users. A user can have various user-created verticals automatically installed for them after completing a list of preferences in a user profile. A user may have chosen to install a user-created vertical created by a friend or recommended to them by a colleague.

At a step 506, it is determined whether one or more of the installed user-created search verticals contains answers relevant to the general web-search query. As described above, this can be done using a programmed keyword list stored for each installed user-created search vertical. If one or more answers is available from one or more of the installed verticals, then at a step 507 the answers are obtained from the installed verticals. At a step 508, general search results relevant to the query are obtained and, at a step 510, the search vertical answers and general results are displayed on a common display. A user interface such as that described with reference to FIG. 6 can be used to display the results. The author of the search vertical from which the answers are obtained can specify or customize the appearance of the user interface in the definition of the search vertical.

Then, at a step 530, a request is received from a user to access a search result, such as by the user clicking on a search result, and revenue data is stored to compensate the search vertical author if the result was obtained using a user-created search vertical. In this embodiment, the URL is augmented to indicate that the search result was obtained using the user-created search vertical. When the request is returned to the search engine server, revenue data is stored to compensate the author of the search vertical based for the user's selection of the result. In embodiments of the present invention, revenue-sharing can be delivered for queries performed within a particular search vertical, for clicks on results presented from the vertical, as described above, or based on advertisements shown by the vertical. The revenue data can be used in determining an appropriate amount of compensation for the search vertical authors of the search verticals from which the answers are obtained. The process of storing the revenue data can include a fraud-detection step to prevent a user from performing queries to invoke his or her own verticals and generate revenue for himself or herself. Such fraud-detection methods are known in the art.

If, at step 506, it is determined that answers relevant to the general search query are not contained in any of the installed search verticals for the user, then at a step 512 a set of non-installed search verticals is analyzed to determine whether any non-installed verticals have matching or similar keywords. If no non-installed verticals having matching or similar keywords are identified, then at a step 514 a general search query is performed and general search results are presented.

If at step 512 non-installed user-created search verticals are identified that have matching or similar keywords, then at a step 516 the set of non-installed verticals is narrowed based on a query-frequency threshold. For example, if a user enters a query for "snowshoes" in a general web-search function and the user has no user-created search verticals installed that have matching keywords, then other non-installed user-created search verticals are identified using keywords from the query. User-created search verticals for "snow gear" or "mountain climbing," for example, may contain keyword lists with matching or similar keywords corresponding to the "snowshoes" query. Then, the "snow gear" and "mountain climbing" search verticals are analyzed to determine whether the query "snowshoes" appears with a sufficiently high frequency in these verticals so as to satisfy a query-frequency threshold. If the query-frequency threshold is satisfied, then at a step 518 the set of remaining verticals is analyzed based on a customer satisfaction rating. Continuing the above example, if the "mountain climbing" vertical satisfies a query-frequency threshold and a customer satisfaction threshold, then this vertical will be used to obtain results. But, if the "snow gear" vertical does not satisfy the customer satisfaction threshold (e.g., by not having a high click-through rate), then it will be eliminated from the list of search verticals being considered.

At a step 520, results are obtained from the list of non-installed user-created search verticals that remain after performing the narrowing of steps 516 and 518. At a step 524, the results obtained from these verticals are analyzed to determine whether they satisfy a confidence threshold. If the results satisfy a confidence threshold, then at a step 526 the results are returned as inline answers. If the results do not satisfy the confidence threshold, then they are returned as one or more inline suggestions at a step 528. As described above, the confidence threshold can be based on the same or similar factors as those used to narrow the list of non-installed user-created search verticals being considered. That is, the confidence threshold can be based on installation status, query-frequency, overall customer satisfaction for the vertical, or query-specific customer satisfaction for the vertical. One or all of these factors can be used in determining whether the results satisfy the confidence threshold. The confidence threshold designates a minimum level of confidence in the reliability of results returned for a particular search vertical. If the minimum level of confidence in the results exists, then the results are returned as inline answers. Otherwise, the results will be suggested to a user in the form of a suggestion recommending that the user obtain results for the general query from the particular search vertical. After the inline answers or suggestions are displayed at step 526 or 528, step 530 is performed as described above.

The exemplary method 500 improves core web search by taking advantage of user-created search verticals. That is, even though a user enters a general search query into a general web-search utility, user-created search verticals that can provide more accurate and reliable results are identified and used to perform the search query and return inline answers or suggestions.

Of course, user-created search verticals can also be directly used by a user performing a search directly in one of the user-created search verticals. For example, a user can install the "knitting" search vertical into the user's customized user interface and can select to perform a search exclusively using the "knitting" user-created search vertical. A user can also select to perform a search directly in the "knitting" search vertical simply by selecting to perform a search in the vertical without having installed the vertical. The search vertical author can be compensated in this context, as well as those contexts described above (i.e., where the author is compensated when results are obtained from a user-created search vertical in response to general search queries). If raw-usage revenue sharing is used, then the author of the search vertical can be compensated for each search query performed in the author's search vertical, or based on selections of results generated by the vertical. In this case, each time the user performs a search directly in the "knitting" vertical or selects results generated by the vertical, as described above, a counter or other revenue-sharing data element is incremented to track usage of the "knitting" vertical. This is done after performing a fraud detection step to ensure that the usage is legitimate. Any fraud detection method can be used. The counter or other revenue-sharing data element can then be used to compensate the author of the "knitting" vertical. The author can also be compensated for each time a user installs the "knitting" vertical. In another embodiment, search vertical usage is tracked by augmenting the URL returned with the search results. When the user selects the URL, the request is returned to the search engine server which records the selection for usage or revenue tracking.

If advertising-based revenue sharing is used, then the author of the search vertical is compensated based on the amount of advertising revenue derived from users of the vertical. For example, if the user performing a search in the "knitting" vertical above obtains results and then selects to view an advertisement displayed with the search results, then the author of the knitting vertical is compensated for any advertising revenue generated from the user having viewed the advertisement. Various methods are often used by search-engine providers to derive advertising revenue from searches performed using their search engines. Any of these methods can be used, and advertising revenue can accordingly be shared with user-created search vertical authors as described above. And, similar fraud-detection methods can be used in the advertising-based context, as well. Similar to the raw-usage revenue-sharing context, a counter or other revenue-sharing data element can be used to track the revenue-sharing information for each user-created search vertical in the advertising-based context.

Figure 6:
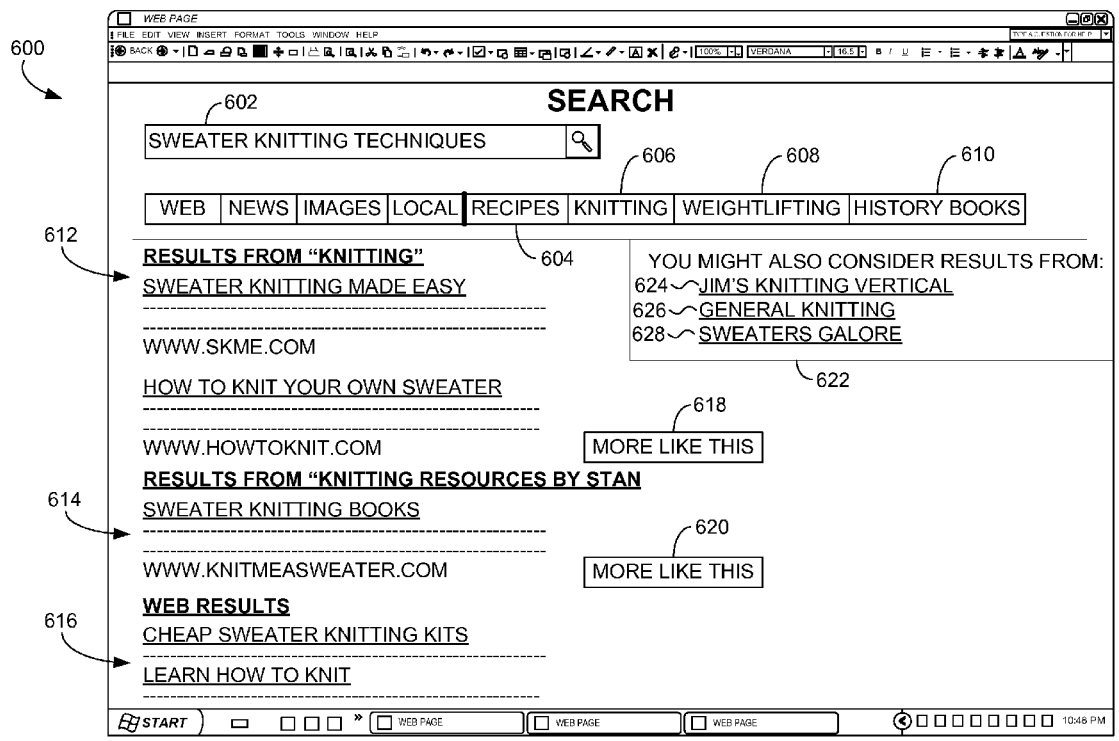
FIG. 6 is an exemplary interactive display of a user interface showing inline search answers and suggestions from user-created search verticals in response to a general web-search query, according to embodiments of the present invention.

FIG. 6 provides an exemplary user interface 600 for displaying inline search answers and suggestions from user-created search verticals in response to a general web-search query. The user interface 600 includes a general search input box 602. The user interface 600 also includes user interface tabs 604, 606, 608, and 610 corresponding to user-created search verticals that a user has installed into the customized user interface. In this case, the user has installed user-created search verticals for "recipes" 604, "knitting" 606, "weight-lifting" 608, and "history books" 610. And, in this case, the user has input a general search query of "sweater knitting techniques" into the search input box 602. A search has been performed using embodiments of the present invention, such as by using exemplary method 500 discussed above. In this case, inline search answers 612 have been displayed for results obtained from a "knitting" vertical, for which the user has installed a tab 606. Thus, the "knitting" vertical constitutes an installed user-created search vertical for this particular user. This can be a vertical created by this particular user or can be a vertical created by another user.

The user interface 600 includes a selectable region 618 operative to receive a request to display more answers similar to the inline answers 612. That is, selectable region 618 allows a user to obtain additional inline answers from the particular search vertical. User interface 600 also displays inline answers 614 from a non-installed user-created search vertical. Selectable region 620 is operative to receive more inline answers similar to inline answer 614. The user interface 600 also displays general search results 616 on a common display with the inline answers 612 and 614. The user interface 600 also displays a suggestions region 622 containing suggestions 624, 626, and 628 corresponding to suggested user-created search verticals that the user may wish to run the search query through to obtain additional results. The suggestions 624, 626, and 628 are displayed on a common display with the general search results 616 and the inline answers 612 and 614. User interface 600 is exemplary in nature, and the present invention is not limited to this particular user interface.

Although the subject matter has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense. And, although the subject matter has been described in language specific to methodological acts, the subject matter defined in the appended claims is not necessarily limited to the specific acts described above. Rather, the specific acts described above are disclosed as example forms of implementing the claims.

The invention claimed is:

1. A method for automatically presenting inline answers or suggestions from user-created web-search verticals in response to a general web-search query, the method comprising:

receiving a general web-search query from a user in a web-search user interface that has been customized by the user selecting to install one or more user-created web-search vertical tabs in the web-search user interface, wherein the user-created web-search verticals have been created by one or more search-engine consumers rather than a search-engine provider;

obtaining general web-search results from the World Wide Web based on the query;

accessing the user-created web-search verticals that have been installed in the customized user-interface by the user;

determining whether answers or suggestions relevant to the query are available from the installed user-created web-search verticals by first accessing a user-created definition for each of the installed user-created web-search verticals to determine whether return of answers or suggestions are supported by each of the installed user-created web-search verticals, and, second, determining whether any keywords from the query are present in a programmed keyword list in each of the installed user-created web-search verticals; and if return of answers or suggestions are supported and if any keywords from the query are present, then, presenting, on a common display with the general web-search results, at least one answer or suggestion from an installed user-created web-search vertical that supports answers or suggestions and that has at least one keyword from the query in its programmed keyword list.

2. The method of claim 1, further comprising storing revenue-sharing data for one of the installed user-created web-search verticals if at least one answer is presented from the installed user-created web-search vertical and the answer is selected by the user.

3. The method of claim 1, further comprising storing revenue-sharing data for one of the installed user-created web-search verticals if at least one answer or suggestion is presented from the installed user-created search vertical.

4. The method of claim 1, further comprising storing revenue-sharing data for one of the installed user-created web-search verticals if the user selects at least one advertisement associated with the installed user-created search vertical.

5. The method of claim 1, further comprising:
determining whether the query satisfies a query-frequency threshold for an installed user-created web-search vertical that supports answers or suggestions and that has at least one keyword from the query in its programmed keyword list, and
if so, presenting, on the common display, at least one answer from the installed user-created web-search vertical that satisfies the query-frequency threshold.

6. The method of claim 1, further comprising:
determining whether the query satisfies a customer satisfaction rating threshold for an installed user-created web-search vertical that supports answers or suggestions and that has at least one keyword from the query in its programmed keyword list, and
if so, presenting, on the common display, at least one answer from the installed user-created web-search vertical that satisfies the customer satisfaction rating threshold.

7. A computer-storage medium having computer-executable instructions embodied thereon for performing the steps recited in claim 1.

8. A system for presenting search answers or suggestions from user-created web-search verticals in response to search queries entered into a general web-search utility, the system comprising:
a data store comprising stored information elements and a plurality of user-created web-search verticals that have been installed into a web-search user interface that has been customized by a user selecting to install one or more user-created web-search vertical tabs in the web-search user interface, wherein the user-created web-search verticals have been created by one or more search-engine consumers rather than a search-engine provider;
a search-engine component operative to obtain general web-search results from the data store and further operative to obtain search answers or suggestions from one or more of the plurality of user-created web-search verticals;
a vertical determiner operative to determine whether to obtain inline search answers or suggestions from one or more of the plurality of user-created web-search verticals by first accessing a user-created definition for each of the user-created web-search verticals to determine whether return of answers or suggestions are supported by each of the user-created web-search verticals, and, second, determining whether any keywords from the query are present in a programmed keyword list in each of the user-created web-search verticals; and
an interface component operative to receive general web-search queries and present inline search answers or suggestions obtained from the plurality of user-created web-search verticals on a common display with the general web-search results in response to the vertical determiner making a determination to obtain inline search answers or suggestions from the one or more user-created web-search verticals.

9. the system of claim 8, further comprising:
a user computer running web-browser software, wherein the user computer is logically coupled to the interface component, search engine component, vertical determiner, and data store via the internet.

10. The system of claim 8, wherein the plurality of user-created web-search verticals comprise a programmed keyword list.

11. The system of claim 8, wherein the vertical determiner comprises code for determining whether a web-search query performed using a particular user-created web-search vertical satisfies a query-frequency threshold and a customer satisfaction rating threshold, and further wherein the vertical determiner is operative to determine to obtain inline search answers or suggestions from the particular user-created web-search vertical if the query-frequency threshold and the customer satisfaction rating threshold are satisfied.

12. The system of claim 8, wherein the data store further comprises a plurality of revenue-sharing elements corresponding to the plurality of user-created web-search verticals, wherein each revenue sharing element stores revenue sharing data based on usage of each user-created web-search vertical to which the revenue sharing element corresponds.

\* \* \* \* \*